US010962807B1

(12) United States Patent
Wiener

(10) Patent No.: US 10,962,807 B1
(45) Date of Patent: Mar. 30, 2021

(54) EYEGLASSES HEADBAND ASSEMBLY

(71) Applicant: Donna Wiener, Staten Island, NY (US)

(72) Inventor: Donna Wiener, Staten Island, NY (US)

( * ) Notice: Subject to any disclaimer, the term of this patent is extended or adjusted under 35 U.S.C. 154(b) by 0 days.

(21) Appl. No.: 16/824,169

(22) Filed: Mar. 19, 2020

(51) Int. Cl.
*G02C 11/00* (2006.01)
*A45D 8/36* (2006.01)

(52) U.S. Cl.
CPC ........... *G02C 11/00* (2013.01); *A45D 8/36* (2013.01)

(58) Field of Classification Search
CPC .......... G02C 11/00; G02C 3/003; G02C 3/02; A45D 8/36
USPC .......................... 351/112, 121, 123, 155, 156
See application file for complete search history.

(56) References Cited

U.S. PATENT DOCUMENTS

| | | | |
|---|---|---|---|
| 2,418,334 A * | 4/1947 | Coccellato | A61F 9/025 2/8.2 |
| 2,541,493 A * | 2/1951 | Barroso | G02C 3/003 351/156 |
| 4,515,449 A | 5/1985 | Davidson | |
| 4,616,367 A | 10/1986 | Jean, Jr. | |
| 4,955,087 A | 9/1990 | Perez | |
| 5,009,496 A | 4/1991 | Holtan, Jr. | |
| D320,608 S | 10/1991 | Holtan, Jr. | |
| D354,970 S | 1/1995 | Bolle | |
| D483,394 S | 12/2003 | Masterson | |
| 7,020,901 B2 * | 4/2006 | Brhel | A61F 11/14 2/209 |
| 7,020,903 B2 * | 4/2006 | Artzberger | A61F 11/14 2/15 |
| 7,665,841 B2 | 2/2010 | Resler | |
| 9,235,062 B1 * | 1/2016 | Desantiago | G02C 3/006 |
| 9,983,417 B1 * | 5/2018 | Huang | G02C 5/2209 |
| 2010/0095977 A1 * | 4/2010 | Schmitz | G02C 3/003 132/275 |
| 2010/0141889 A1 * | 6/2010 | Resler | G02C 3/003 351/44 |
| 2016/0015566 A1 * | 1/2016 | Vollet | A61F 11/14 2/431 |

* cited by examiner

*Primary Examiner* — William R Alexander

(57) ABSTRACT

An eyeglasses headband assembly includes a pair of eyeglasses that has a frame and a pair of arms each pivotally coupled to the frame for wearing on a user's face. A headband is pivotally coupled to the pair of eyeglasses and the headband is positionable in a stored position having the headband extending forwardly along the arms and across the frame. The headband is positionable in a deployed position having the headband extending upwardly from the pair of arms. In this way the headband can be positioned to extend across the user's head when the user is wearing the eyeglasses. Thus, the headband can keep the user's hair from falling across the user's face.

4 Claims, 5 Drawing Sheets

EYEGLASSES HEADBAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to headband devices and more particularly pertains to a new headband device for keeping a user's hair pulled back while wearing eyeglasses.

(2) Description of Related Art Including Information Disclosed Under 37 CFR 1.97 and 1.98

The prior art relates to headband devices. The prior art discloses a head band, having an adjustable length, that can be slid onto a pair of eyeglasses. The prior art discloses a head harness that can be slid onto a pair of eyeglasses for securing the eyeglasses to a user's head. The prior art discloses a head band that has a pair of lenses thereon that are aligned with the user's eyes when the head band is worn around the user's head. Additionally, the prior art discloses an adjustable head band that is mounted to a pair of eyeglasses for extending around the back of a user's head when the eyeglasses are worn. The prior art also discloses a pair of eyeglasses that are pivotally coupled to a headband for raising or lowering the eyeglasses with respect to a user's eyes.

BRIEF SUMMARY OF THE INVENTION

An embodiment of the disclosure meets the needs presented above by generally comprising a pair of eyeglasses that has a frame and a pair of arms each pivotally coupled to the frame for wearing on a user's face. A headband is pivotally coupled to the pair of eyeglasses and the headband is positionable in a stored position having the headband extending forwardly along the arms and across the frame. The headband is positionable in a deployed position having the headband extending upwardly from the pair of arms. In this way the headband can be positioned to extend across the user's head when the user is wearing the eyeglasses. Thus, the headband can keep the user's hair from falling across the user's face.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
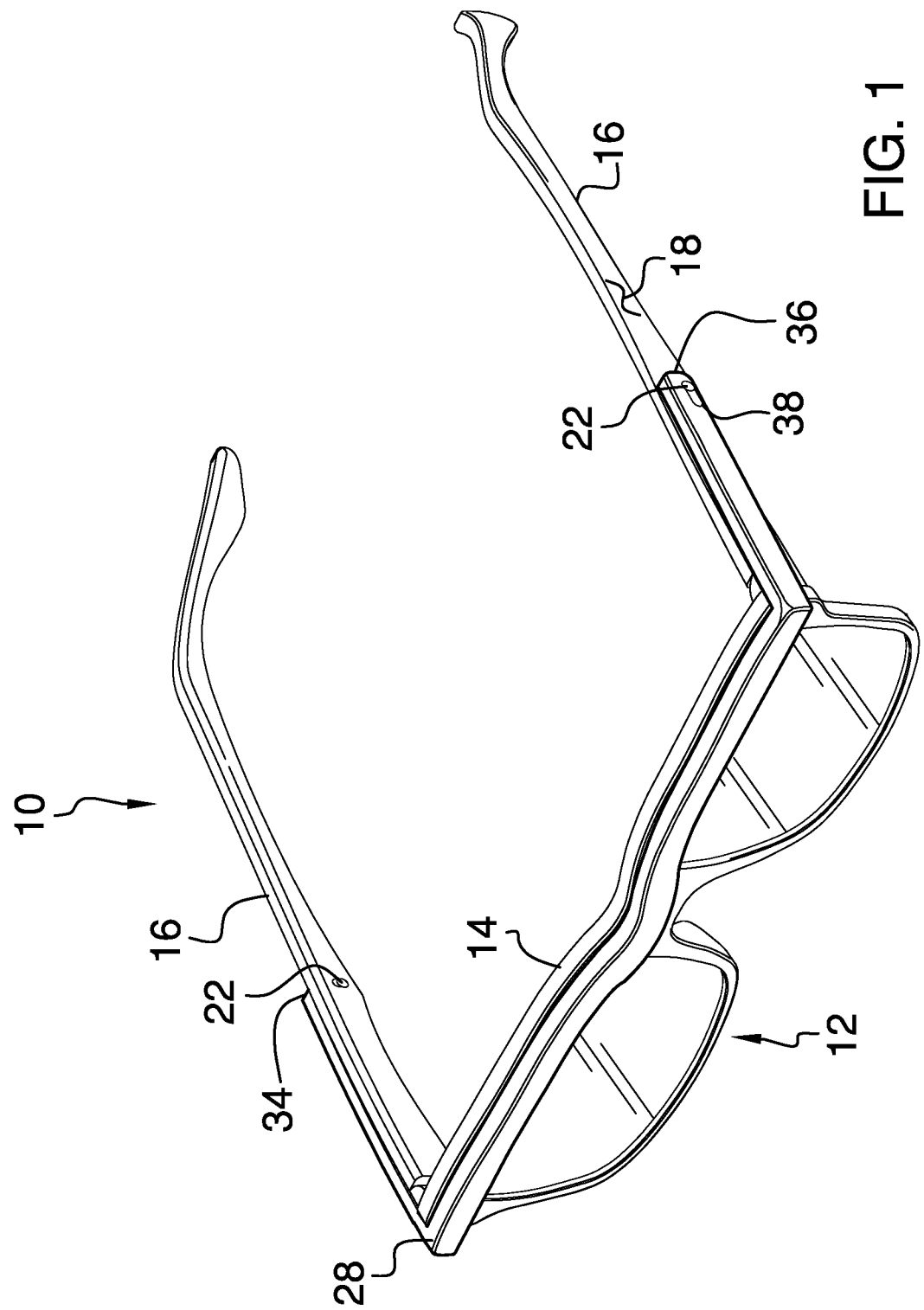
FIG. 1 is a front perspective view of an eyeglasses headband assembly according to an embodiment of the disclosure showing a headband in a stored position.
Figure 2:
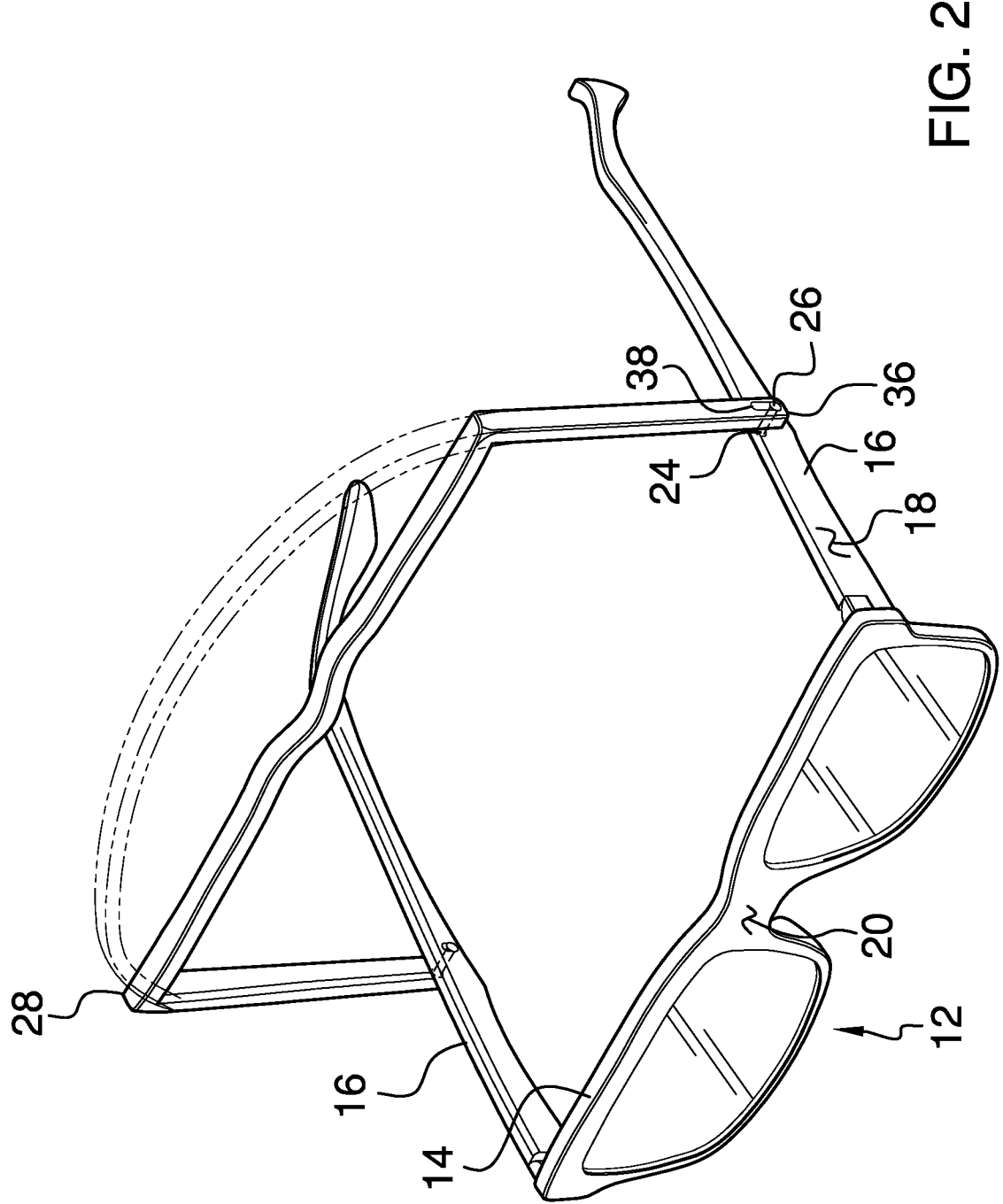
FIG. 2 is a front perspective view of an embodiment of the disclosure showing a headband in a deployed position.
Figure 3:
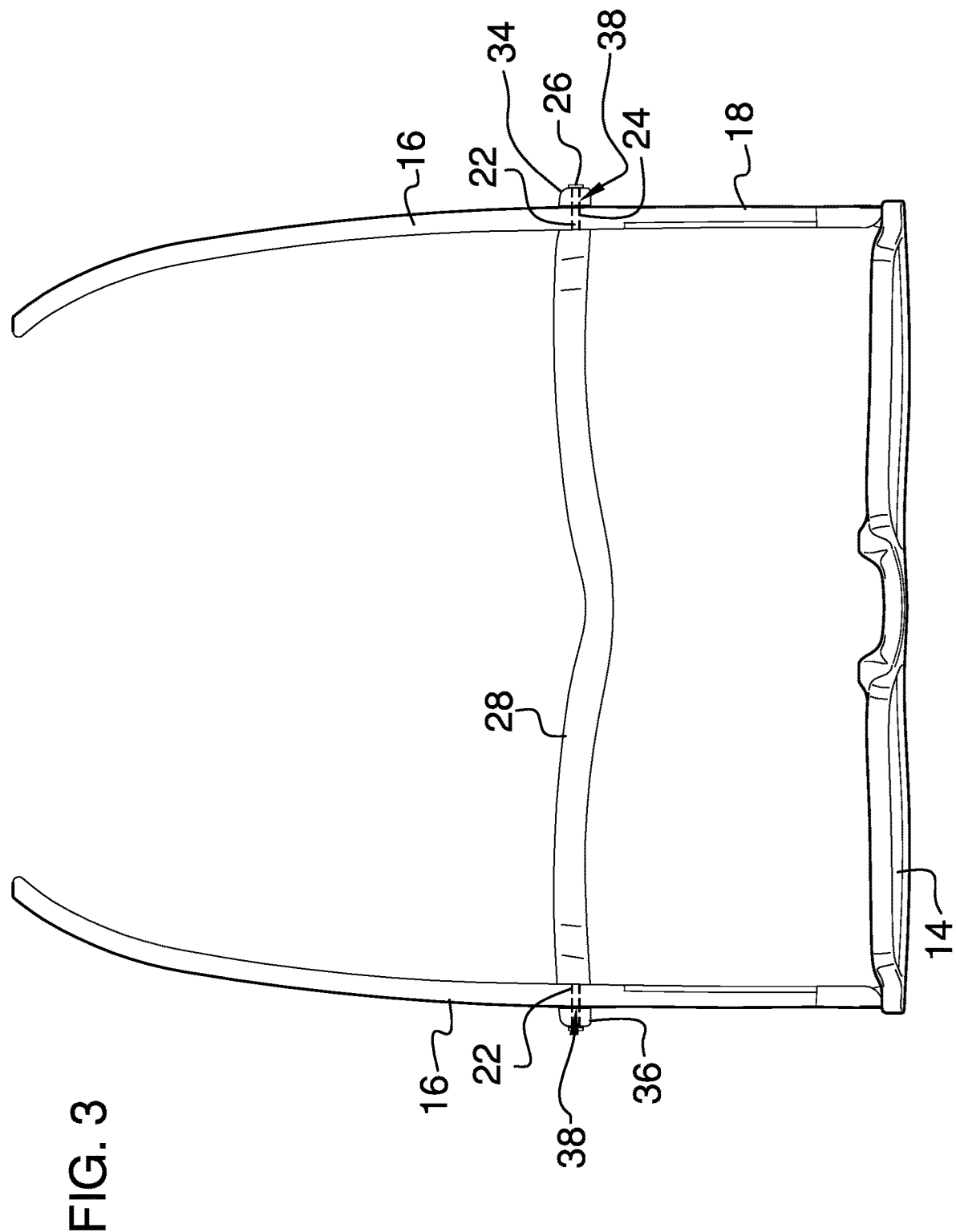
FIG. 3 is a bottom phantom view of an embodiment of the disclosure.
Figure 4:
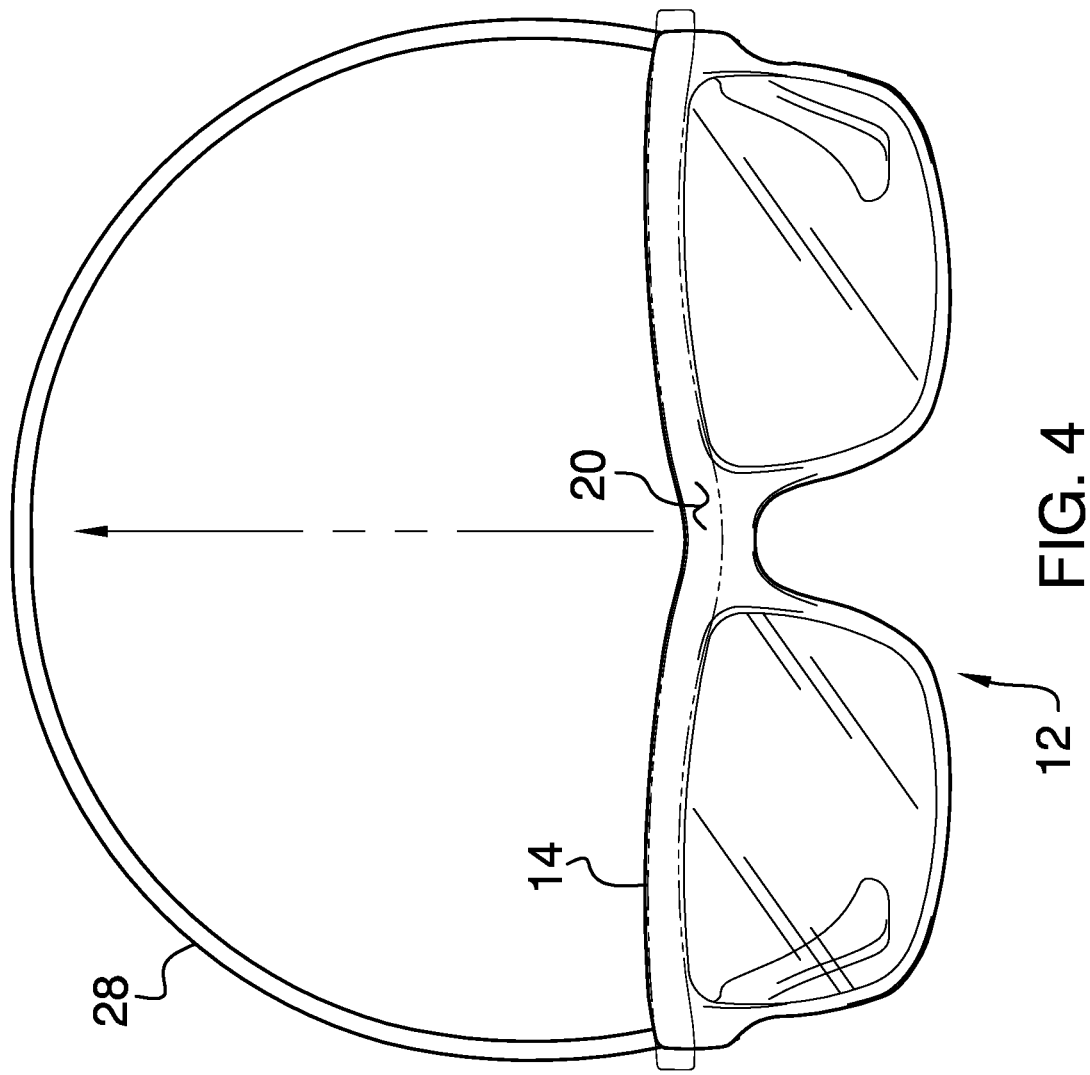
FIG. 4 is a front view of an embodiment of the disclosure.
Figure 5:
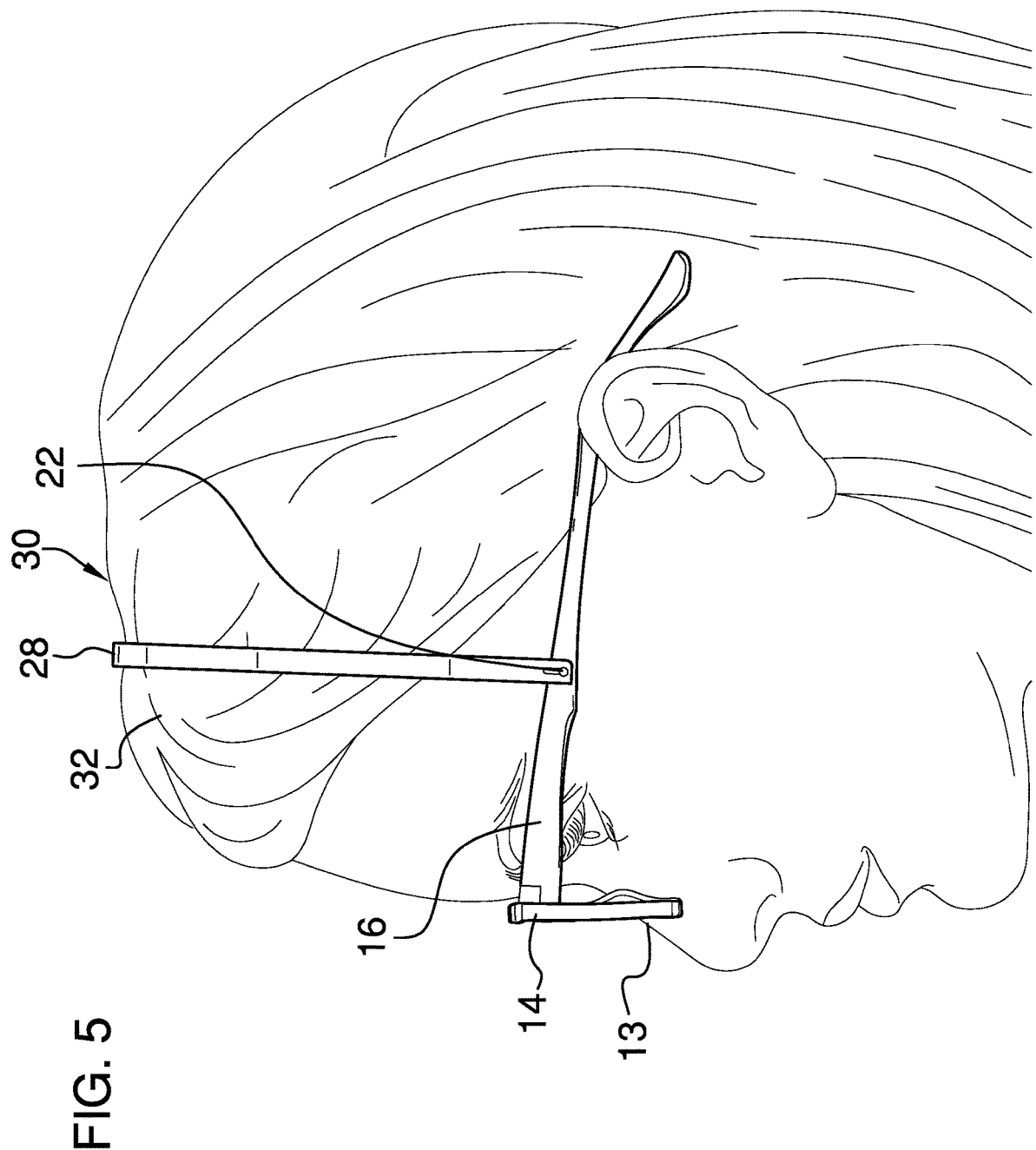
FIG. 5 is a perspective in-use view of an embodiment of the disclosure.

With reference now to the drawings, and in particular to FIGS. 1 through 5 thereof, a new headband device embodying the principles and concepts of an embodiment of the disclosure and generally designated by the reference numeral 10 will be described.

As best illustrated in FIGS. 1 through 5, the eyeglasses headband assembly 10 generally comprises a pair of eyeglasses 12 that has a frame 14 and a pair of arms 16 each is pivotally coupled to the frame 14. Moreover, the pair of eyeglasses 12 can be worn on a user's face 13. Each of the arms 16 has an outwardly facing surface 18 and the frame 14 has a front surface 20. The pair of eyeglasses 12 may comprise corrective lenses, sunglasses or any other type of eyeglasses that the user might wear.

A pair of engagements 22 is provided and each of the engagements 22 is coupled to a respective one of the arms 16. Each of the engagements 22 is positioned on the outwardly facing surface 18 of the respective arm 16 and each of the engagements 22 is spaced from the frame 14. Each of the engagements 22 comprises a stem 24 extending away from the respective arm 16 and a head 26 that is spaced from the respective arm 16.

A headband 28 is provided and the headband 28 is pivotally coupled to the pair of eyeglasses 12. The headband 28 is positionable in a stored position has the headband 28 extending forwardly along the arms 16 and across the frame 14. Additionally, the headband 28 is positionable in a deployed position has the headband 28 extending upwardly from the pair of arms 16. In this way the headband 28 can be positioned to extend across the user's head 30 when the user is wearing the eyeglasses 12. Thus, the headband 28 keeps the user's hair 32 from falling across the user's face 13 when the user has a hair style that involves long hair.

The headband 28 is comprised of a resiliently stretchable material to accommodate a variety of sizes of heads. The headband 28 has a first end 34 and a second end 36, and the headband 28 is elongated between the first end 34 and the second end 36. The headband 28 has a pair of slots 38 each extending therethrough and each of the slots 38 is positioned adjacent to a respective one of the first end 34 or the second end 36. Each of the engagements 22 extends through a respective one of the slots 38 for pivotally retaining the headband 28 on the eyeglasses 12. The stem 24 of each of the engagements 22 extends through the respective slot 38 has the head 26 is exposed on the headband 28. Additionally, the head 26 on each of the engagements 22 has a diameter that is greater than the width of the slots 38 thereby inhibiting the headband 28 from is removed from the eyeglasses 12.

In use, the headband 28 is positioned in the stored position for wearing the eyeglasses 12 in the traditional fashion. The headband 28 is moved into the deployed position to extend over the user's head 30. Additionally, the user pulls the user's hair 32 back prior to positioning the headband 28 over their head 26. In this way the headband 28 keeps the user's hair 32 from falling across their face 13 while the user is wearing the eyeglasses 12. Thus, wind is inhibited from blowing the user's hair 32 around while the user is wearing the eyeglasses 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An eyeglasses headband assembly for keeping a user's hair pulled back while wearing eyeglasses, the assembly comprising:
   a pair of eyeglasses having a frame and a pair of arms each being pivotally coupled to the frame wherein the pair of eyeglasses being configured to be worn on a user's face; and
   a headband being pivotally coupled to the pair of eyeglasses, the headband being positionable in a stored position having the headband extending forwardly along the arms and across the frame, the headband being positionable in a deployed position having the headband extending upwardly from the pair of arms wherein the headband being configured to be positioned to extend across the user's head when the user being wearing the eyeglasses thereby facilitating the headband to keep the user's hair from falling across the user's face;
   each of the arms having an outwardly facing surface, the frame having a front surface;
   the assembly including a pair of engagements, each of the engagements being coupled to a respective one of the arms, each of the engagements being positioned on the outwardly facing surface of the respective arm, each of the engagements being spaced from the frame; and
   the headband having a first end and a second end, the headband being elongated between the first end and the second end, the headband having a pair of slots each extending therethrough, each of the slots being positioned adjacent to a respective one of the first end or the second end, each of the engagements extending through a respective one of the slots for pivotally retaining the headband on the eyeglasses.

2. The assembly according to claim 1, wherein the headband being comprised of a resiliently stretchable material wherein the headband being configured to accommodate the head of an adult wearer.

3. An eyeglasses headband assembly for keeping a user's hair pulled back while wearing eyeglasses, the assembly comprising:
   a pair of eyeglasses having a frame and a pair of arms each being pivotally coupled to the frame wherein the pair of eyeglasses being configured to be worn on a user's face;
   a headband being pivotally coupled to the pair of eyeglasses, the headband being positionable in a stored position having the headband extending forwardly along the arms and across the frame, the headband being positionable in a deployed position having the headband extending upwardly from the pair of arms wherein the headband being configured to be positioned to extend across the user's head when the user being wearing the eyeglasses thereby facilitating the headband to keep the user's hair from falling across the user's face;
   each of the arms having an outwardly facing surface, the frame having a front surface;
   the assembly including a pair of engagements, each of the engagements being coupled to a respective one of the arms, each of the engagements being positioned on the outwardly facing surface of the respective arm, each of the engagements being spaced from the frame;
   wherein each of the engagements comprises a stem extending away from the respective arm and a head being spaced from the respective arm,
   the headband has a first end and a second end, the headband being elongated between the first end and the second end, the headband having a pair of slots each extending therethrough; and
   the stem of each of the engagements extends through the respective slot having the head being exposed on the headband, the head on each of the engagements having a diameter being greater than the width of the slots thereby inhibiting the headband from being removed from the eyeglasses.

4. An eyeglasses headband assembly for keeping a user's hair pulled back while wearing eyeglasses, the assembly comprising:

a pair of eyeglasses having a frame and a pair of arms each being pivotally coupled to the frame wherein the pair of eyeglasses being configured to be worn on a user's face, each of the arms having an outwardly facing surface, the frame having a front surface;

a pair of engagements, each of the engagements being coupled to a respective one of the arms, each of the engagements being positioned on the outwardly facing surface of the respective arm, each of the engagements being spaced from the frame, each of the engagements comprising a stem extending away from the respective arm and a head being spaced from the respective arm; and a headband being pivotally coupled to the pair of eyeglasses, the headband being positionable in a stored position having the headband extending forwardly along the arms and across the frame, the headband being positionable in a deployed position having the headband extending upwardly from the pair of arms wherein the headband being configured to be positioned to extend across the user's head when the user being wearing the eyeglasses thereby facilitating the headband to keep the user's hair from falling across the user's face, the headband being comprised of a resiliently stretchable material wherein the headband being configured to accommodate a variety of sizes of heads, the headband having a first end and a second end, the headband being elongated between the first end and the second end, the headband having a pair of slots each extending therethrough, each of the slots being positioned adjacent to a respective one of the first end or the second end, each of the engagements extending through a respective one of the slots for pivotally retaining the headband on the eyeglasses, the stem of each of the engagements extending through the respective slot having the head being exposed on the headband, the head on each of the engagements having a diameter being greater than the width of the slots thereby inhibiting the headband from being removed from the eyeglasses.

\* \* \* \* \*